United States Patent [19]
Pile

[11] 3,942,484
[45] Mar. 9, 1976

[54] IMPELLER TYPE ENGINE

[76] Inventor: Delbert W. Pile, P.O. 845, Middletown, N.J. 07701

[22] Filed: Sept. 12, 1973

[21] Appl. No.: 396,584

[52] U.S. Cl. ............... 123/8.41; 123/8.43; 418/219
[51] Int. Cl.² ......................................... F02B 53/08
[58] Field of Search ........... 418/217, 219, 229, 230, 418/231, 232; 123/8.23, 8.41, 8.43, 8.33, 8.35

[56] References Cited
UNITED STATES PATENTS

| | | | |
|---|---|---|---|
| 1,238,806 | 9/1917 | Painter | 123/8.35 |
| 1,464,408 | 8/1923 | Collier | 123/8.41 X |
| 1,839,638 | 1/1932 | Beals et al. | 123/8.35 |
| 2,154,456 | 4/1939 | Knapp | 418/219 |
| 3,773,022 | 11/1973 | Costantinov | 123/8.43 |

FOREIGN PATENTS OR APPLICATIONS

| | | | |
|---|---|---|---|
| 313,280 | 6/1929 | United Kingdom | 123/8.41 |
| 25,462 | 4/1910 | United Kingdom | 418/219 |
| 648,568 | 1/1951 | United Kingdom | 123/8.43 |
| 631,254 | 6/1936 | Germany | 123/8.33 |

*Primary Examiner*—C. J. Husar
*Assistant Examiner*—Leonard Smith
*Attorney, Agent, or Firm*—Roger A. Clapp

[57] ABSTRACT

An impeller type engine is disclosed which includes two cover members joined to form a housing, two cam members disposed in the housing facing each other to form a sinuous track of uniform width, a shuttle slidably disposed in the track, an impeller to carry the shuttle as it slides in the track, and means for introducing and igniting a fuel charge and discharging the combustion by-products.

22 Claims, 16 Drawing Figures

IMPELLER TYPE ENGINE

BACKGROUND OF THE INVENTION

1. Field of the Invention

This invention relates to internal combustion engines and pertains in particular to those in which an impeller transmits the operative force to the driving mechanism.

2. Description of the Prior Art

The typical impeller type engine utilizes a rotor as the means for developing the desired operating force. Consequently, if the driving mechanism does not respond directly to rotary forces, a transducer is required to convert rotary forces into a form compatible with the driving mechanism. Addition of such transducers, however, introduces additional cost and complexity to the engine.

Accordingly, one object of this invention is to achieve an impeller driven engine which is directly compatible with drive mechanisms of various types.

Engines in which the impeller is a rotor may require many moving parts to achieve satisfactory operation. Where moving parts proliferate, however, manufacturing and operating difficulties increase.

Accordingly, another object of this invention is to reduce the mechanical complexity of an impeller driven engine.

Rotary engines typically increase developed horsepower by adding additional rotors to the drive shaft. As a result, the drive shaft must lengthen thereby increasing engine size.

Accordingly, another object of this invention is to achieve increased engine capacity without increasing drive shaft length.

Rotary engine designs aim to achieve efficiency and long lasting operation. If the internally developed forces are dynamically unbalanced, however, efficiency will suffer and operating life may be shortened.

Accordingly, another object of this invention is to achieve a rotary engine in which the developed forces are dynamically balanced.

The performance of rotary engines, as well as other internal combustion types, is sensitive to the dimensions of the combustion and compression chambers. In most engines, however, the dimensions are not easily changed. But if those dimensions could be adjusted without undue difficulty, a more versatile engine would result.

Accordingly, another object of this invention is to achieve an internal combustion engine in which the dimensions of the combustion and compression chambers may readily be changed.

In today's ecology, efficient combustion of fuel in an internal combustion engine is critical. One way of achieving more complete combustion is to provide an elongated combustion period.

Accordingly, another object of this invention is to achieve a prolonged combustion period.

SUMMARY OF THE INVENTION

In accordance with a preferred embodiment of the invention, two facing cam surfaces are combined with a housing, a reciprocating shuttle and an impeller movably mounted between the cam surfaces. The two cam surfaces cooperate with each other to form a shuttle track of uniform width and both cam surfaces cooperate with the impeller to divide the shuttle track into a series of compartments alternately located on either side of the impeller. The impeller transports the shuttle along the shuttle track so that it passes through the compartments and the shuttle reciprocates in the moving impeller as it travels along the walls of the shuttle track so as to divide each compartment into a compression chamber and a vacuum chamber as the compartment is traversed. Engine action is achieved by exploding a fuel charge in the vacuum chamber behind the shuttle.

According to one feature of the invention, the track is disposed in a flat plane for reciprocal impeller operation or in a ring to achieve conventional rotary operation in order to achieve versatility in engine design.

According to another feature of the invention, the shuttle track readily accommodates various combinations of cam cycles and shuttles.

According to another feature of this invention, apparatus for introducing a fuel charge into selected compartments cooperates with a communicating port adapted to transitionally link selected compression and vacuum chambers so that ignition of said fuel charge will advance the shuttle in its journey along the shuttle track.

According to another feature of this invention, simplicity of construction is achieved by limiting the essential moving parts to a shuttle and an impeller.

According to another feature of this invention, multiple shuttle tracks are spatially superimposed to form drive rings concentrically arranged around a common section of a drive shaft whereby increased power capacity is achieved without increase in drive shaft length.

According to another feature of this invention, the impeller is circular and contains two cam cycles and two shuttles mounted in its periphery 180° apart whereby combustion forces developed in the engine will be dynamically balanced.

According to another feature of this invention, the combustion and compression chambers are separated into individual compartments whereby their relative volumes can readily be made different.

According to another feature of this invention, the dimensions of the combustion chamber are larger than those of the compression chamber so as to increase the combustion period.

A better understanding of these and other objects and features of this invention will be facilitated by the following drawing and detailed description.

DETAILED DESCRIPTION

Figure 1:
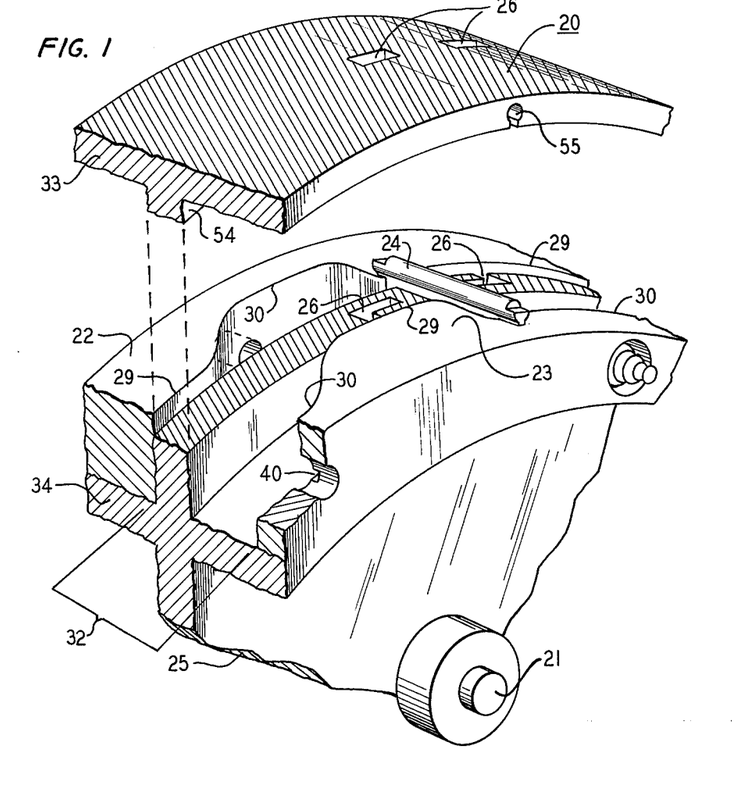
FIG. 1 is a partially exploded view of an impeller type engine made in accordance with this invention and having portions cut away to show the rotor, cam surfaces, chambers, and shuttle.

Referring to FIG. 1, a portion of an impeller engine 20 is illustrated which comprises a drive shaft 21, two cam members 22 and 23, a shuttle 24, an impeller 25 and a communicating port 26 perforated in the impeller 25.

Each cam member 22 and 23 includes a cam surface formed by a series of lands 29 and grooves 30 connected to each other in serial relationship. As best seen in FIGS. 2 through 5, the cam surfaces cooperate with the impeller 25 to form compartments 31a, 31b, and 31c. In addition, they cooperate with each other to form, between their faces, a shuttle track 32 of uniform width. Moreover, the impeller 25 includes a pair of annular flanges 33 and 34 which cooperate with the cam members 22 and 23 to enclose the shuttle track 32 in a sealed channel or tunnel. It is to be noted that the lands and grooves need not be of the same length although smooth curves joining the two are desirable. For exampmle, by elongating the grooves, longer combustion periods can be obtained, thereby improving fuel efficiency and reducing ecologically undesirable by-products.

The impeller 25, as best understood from FIGS. 2 through 5, moves between the cam surfaces and transports the shuttle 24 along the shuttle track 32. The shuttle 24 is slidably mounted in the impeller 25 so as to reciprocate therein as it follows the shuttle track 32. As the shuttle 24 passes through, it initially divides each compartment 31a, 31b, and 31c, into a compression chamber 35a, 35b, and 35c and a vacuum chamber 36a, 36b, or 36c, respectively.

Figure 4:
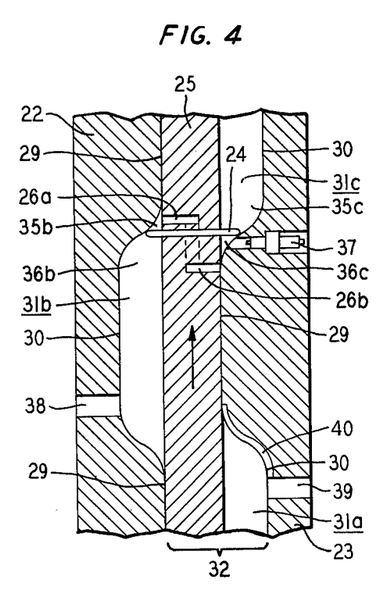

As best seen in FIG. 4, the communicating port 26 comprises two parts, 26a and 26b, and transitionally links the compression chamber 35b to the vacuum chamber 36c on the opposite side of the impeller 25. Consequently, gasses compressed in the compression chamber 35b are free to expand into the vacuum of combustion chamber 36c. Moreover, the vacuum or combustion chamber 36c may include an ignition device 37 such as a spark plug which has electrodes in communication with the gas mixture therein. As a result, actuation of the ignition device 37, when the vacuum chamber 36 is filled with a compressed fuel charge, will result in an explosion and concomitant drive of the shuttle 24 farther along the shuttle tract 32.

Figure 2:
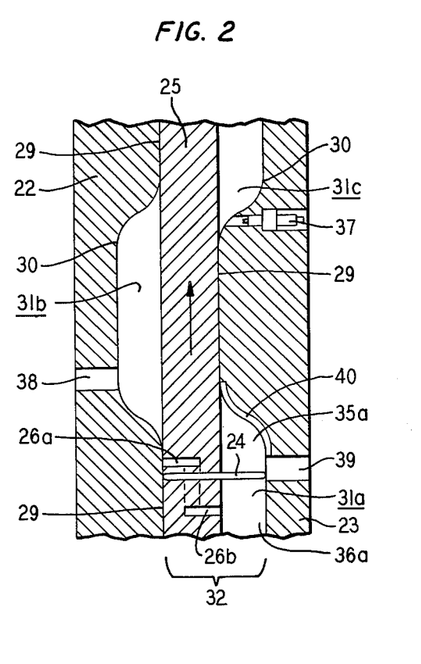
FIGS. 2 through 5 schematically illustrate the mechanical interaction of the components shown in FIG. 1 during an operating cycle.

The full operating cycle of the impeller engine 20 is best understood by reference to FIG. 2 where the shuttle 24 is shown just entering the compartment 31b. An intake port 38 vents into the compartment 31b and has already delivered a fuel charge. In passing, it will be noted that adjusting the location of the intake port 38 within the compartment 31b is a particularly convenient way of adjusting the compression ratio. Alternatively, the dimensions of compartment 31b can be adjusted; i.e., so that the compression chamber 35b tapers.

Figure 3:
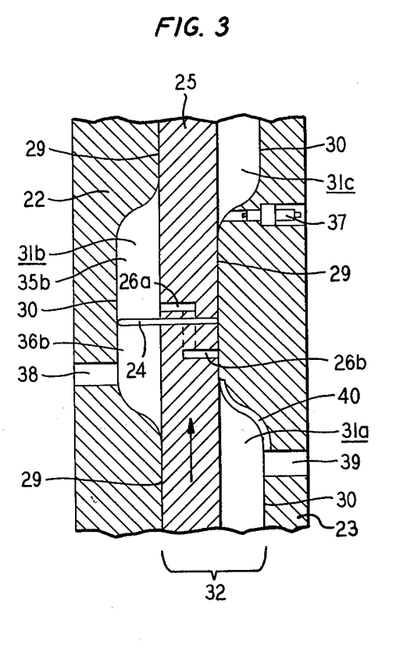
Figure 7:
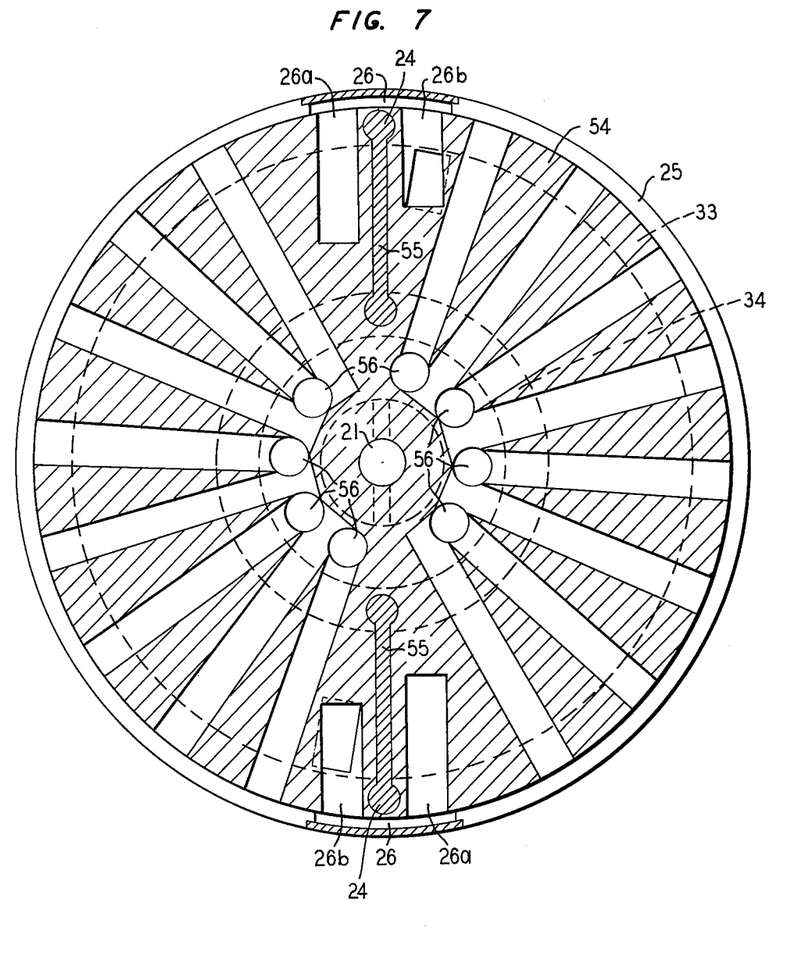
FIG. 7 is a front elevation view of the embodiment of the invention shown in FIG. 6 as taken in section along the line 7 — 7.

The fuel charge, as can be recognized from FIG. 3, is compressed as the shuttle 24 moves along the shuttle track 32. Moreover, as the vacuum chamber 36b expands behind the moving shuttle, a new charge is drawn in and stored in preparation for the next cycle. As the shuttle 24 nears the end of the compartment 31b, it enters the compartment 31c on the other side of the impeller 25. As it does so, as best seen in FIG. 4, the communicating port 26 transitionally links the compression chamber 35b with the vacuum chamber 36c in the compartment 31c. As a result, compressed gasses flow from one chamber to the other. It will be noted, however, that the port 26 and shuttle 24 are juxtaposed in the impeller 25 so that the two chambers are not linked until the shuttle passes the ignition device 37. As a result, leakage will be prevented between the chambers 35c and 36c. To facilitate spacing, the two openings of the port 26 are located on radial lines of the impeller 25, as shown in FIG. 7.

Figure 5:
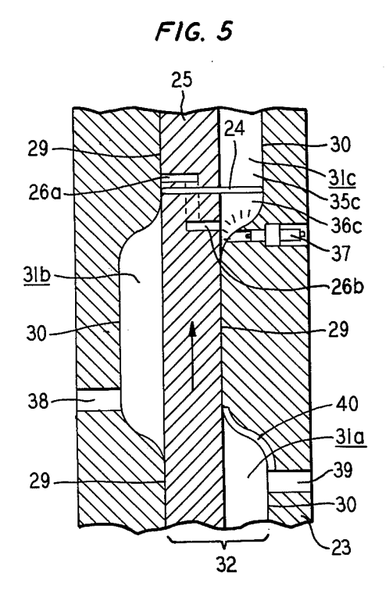

As the shuttle 24 moves on, as shown in FIG. 5, communication between the two compartments 31b and 31c is discontinued and the ignition device 37 is activated thereby causing an explosion which impels the shuttle 24 farther down the shuttle track 32. As the shuttle 24 moves, it drives the impeller 25, thereby causing the drive shaft 21 to rotate. From the foregoing, it can be seen that the forces developed against the shuttle 24 are applied tangentially to the impeller 25. Furthermore, this effect is achieved whether there is one or a multiple of shuttles.

As can be understood from FIG. 2, the compartments 31a includes an exhaust port 39. Consequently, any previously exploded gas by-products will be swept out ahead of the shuttle 24 as it moves therethrough. If necessary, the exhaust port 39 cooperates with a slot 40 to insure complete exhaustion of the chamber 35a. When the shuttle 24 passes entirely through the compartment 31a, it returns to its initial position as shown in FIG. 2, ready to begin again. While the foregoing describes a carburation type engine, it will be recognized that a suitable fuel injection system will work equally as well.

Figure 6:
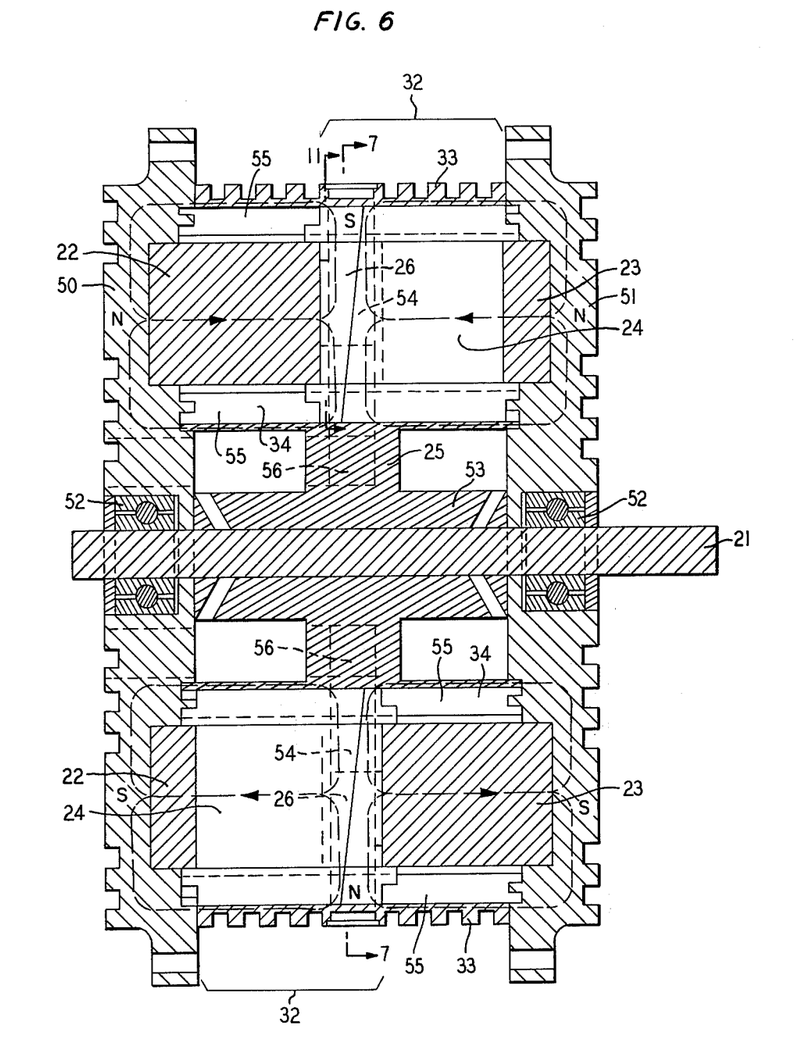
FIG. 6 is a side elevation view taken in section of a rotary type engine made in accordance with this invention.

Referring to FIG. 6, the cam member 22 and 23 are incorporated into two side covers 50 and 51. Advantageously, the two side covers are metal casting suitably spaced and mechanically fastened together and each is ribbed on the outside to facilitate heat dissipation. Each, moreover, includes a bearing 52. If desired, the cam members 22 and 23 can be cast as an integral part of the side covers 50 and 51 or, as illustrated, fabricated separately and inserted into receiving pockets. In either case, they cooperate with each other to form the shuttle track 32 between their facing cam surfaces.

The bearings 52 accommodate the ends of the drive shaft 21 which is rigidly attached to the impeller 25 by a hub 53. A web 54 extends outwardly from the periphery of the hub 53 and supports the two flanges 33 and 34 in annular spaced relationship.

The flanges 33 and 34, as best seen in FIG. 6, cooperate with each other and the web 54 to form two back to back or oppositely facing channels. The peripheral ends of the channels snugly engage the side covers 50 and 51 and the point of junction may advantageously be dove-tailed to improve the seal as the components slide past each other during operation.

In the embodiment shown in FIG. 6, two shuttles 24 are illustrated and both are mounted to slide in a set of slots 55. As best seen in FIG. 7, the slots 55 perforate the web 54 and the flanges 33 and 34 and extend from one channel to the other. As a consequence, the shuttles 24 will reciprocate through the web 54 as they journey along the shuttle track 32. As best seen in FIG. 7, the shuttles 24 slide in slots 55 which are positioned 180° apart in the web 54 of the impeller 25. Since the forces of explosion from the ignited fuel charge act against the shuttles 24 in a direction tangential to the impeller 25, the rotational forces or moments will be additive, but the translational forces acting on the drive shaft 21 will be opposed thereby leaving the engine dynamically balanced. It will be readily understood that the same dynamic balance can be maintained when additional shuttle-pairs are used by providing the appropriate number of cam cycles.

In the embodiment illustrated in FIG. 6, the impeller 25 is a rotor. As can be seen from FIGS. 6 and 7, the web 54 can be perforated by an array of radial ports 56. If desired, the ports can be used to conduct or pump a gas or fluid for cooling, supercharging, starting, or other purposes. Further, the outer flange 33 can readily be equipped with a ring gear for delivering output power or for introducing a starting torque. In addition, between the side covers 50 and 51, the impeller 25 could be sealed in an outer enclosure. The enclosure could readily be filled with a fluid which would tend to seal the engine and prevent leakage. Where the fluid was fuel, a supercharger effect could readily be achieved.

Figure 11:
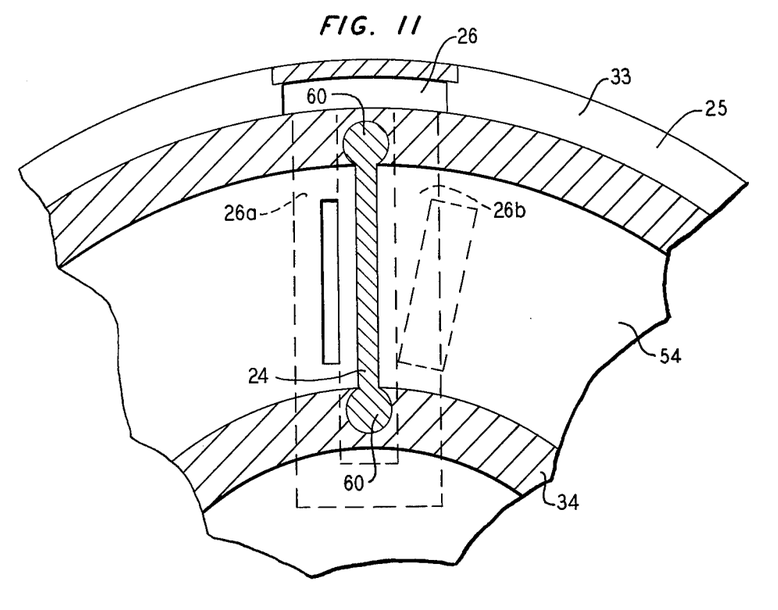
FIG. 11 is a side elevation view of a portion of the embodiment of this invention shown in FIG. 6 as taken in section along the line 11 — 11.
Figure 12:
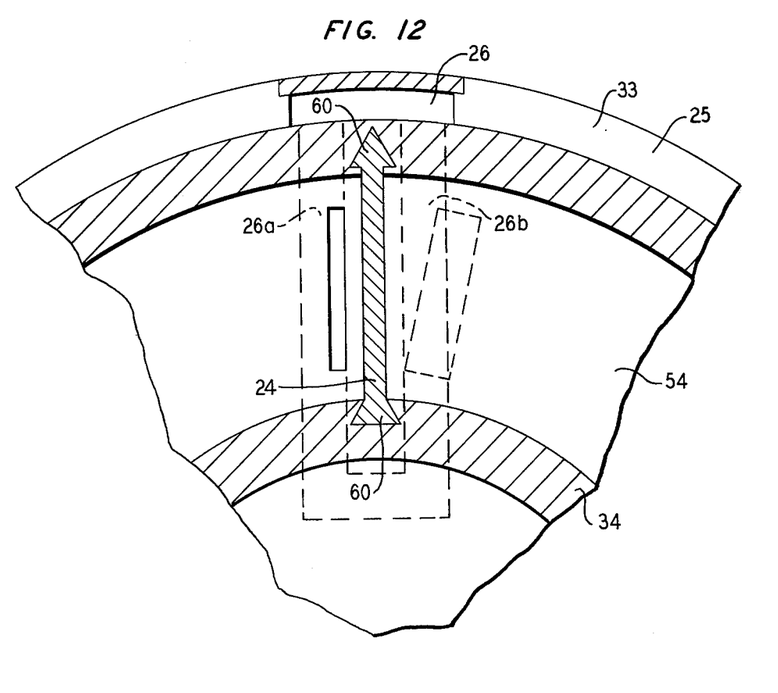
FIG. 12 is the same side elevation view shown in FIG. 11, but illustrates an alternate form of shuttle configuration.

Each shuttle 24, as best seen in FIGS. 8, 9, 10, and 16, has edges 60 adapted to fit the slots 55. In addition, each has ends 61 adapted to slidably mate with the cam members 22 and 23; i.e., rounded so as to present a curved surface so that the shuttle 24 is in continuous contact with the cam surfaces. In the embodiment shown in FIG. 7, the slots 55 are advantageously formed from drilled holes open along one side to accommodate the shuttle 24. As best seen in FIGS. 11 and 12, the edges 60 can easily be configured in different cross-sections to obtain tight seals. As shown in FIG. 11, for example, the cross-section of the edges are cylindrical over most of the shuttle length.

The embodiment illustrated in FIG. 12, however, may provide better seals, when necessary. As shown, the outermost edge is arrow shaped, while the inner edge is formed in the shape of a truncated wedge. As the impeller 25 spins, the shuttle 24 is subjected to centrifugal forces. Consequently, the edges 60 will lap into the mating surfaces of the slots as they reciprocate so as to obtain polished junctions.

Figure 8:
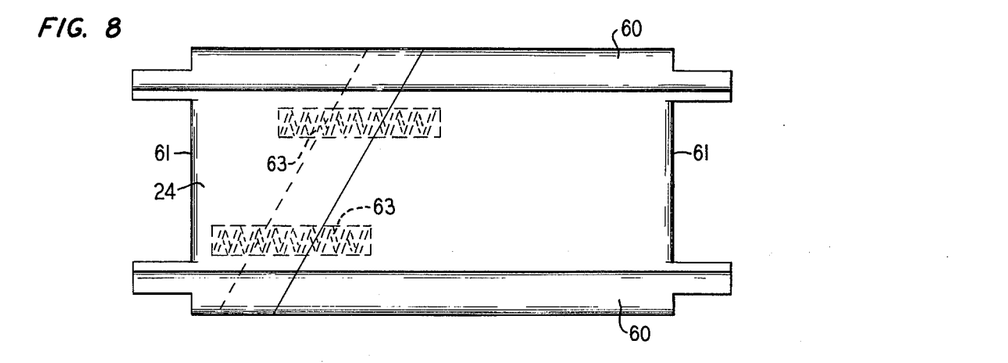
FIG. 8 is a side elevation view of a spring-biased shuttle made in accordance with this invention.
Figure 9:
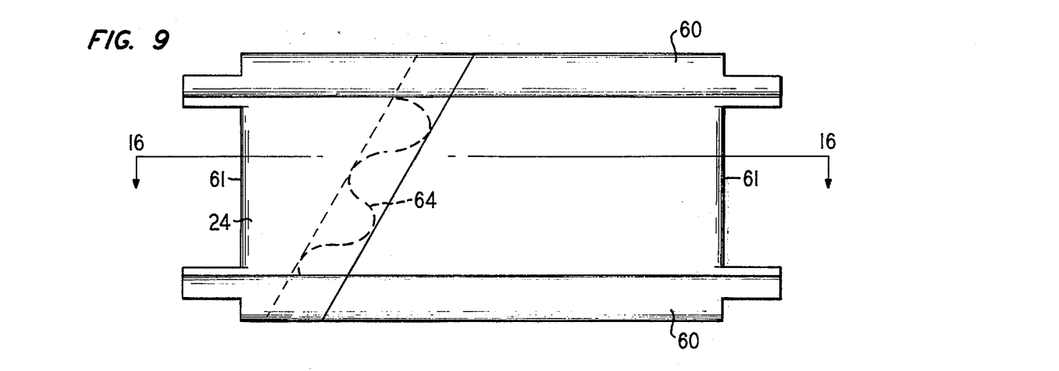
FIG. 9 is a side elevation view of an alternative form of the spring-biased shuttle shown in FIG. 8.
Figure 10:
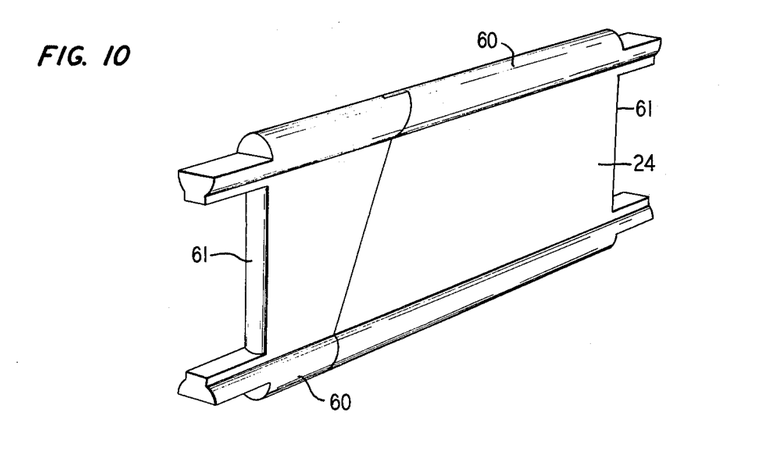
FIG. 10 is a perspective view of the shuttle shown in FIG. 8.
Figure 16:
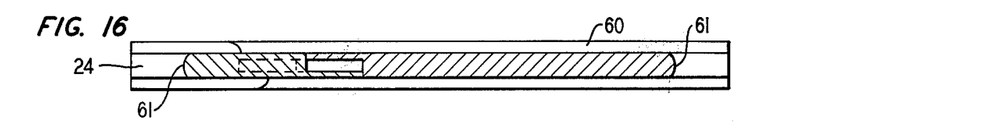
FIG. 16 is a plan view of the shuttles shown in FIG. 9, taken in section along the line 16 — 16.

Referring to FIGS. 8, 9, 10, and 16, the ends 61 are notched so as to embrace the cam members 22 and 23 and dovetail the side covers 50 and 51, as particularly shown in FIG. 6. Furthermore, each is biased away from the other so as to achieve a tighter seal with the cam members 22 and 23. As best seen in FIGS. 8 and 9, the biasing mechanism can be coil springs 63, or a leaf spring 64. As shown in FIG. 16, however, the shuttles must be split so as to have overlapping surfaces when using spring biasing to insure a good seal. Alternately, the ends can be magnetically attractive and a source of magnetic flux (not shown) can be mounted in an appropriate spot in the cam members 22 and 23.

Fluid communication between compression and vacuum chambers is provided by the port 26. As best seen in FIGS. 7, 11 and 12, it opens on one side of the web 54 and exits on the other. It by-passes the shuttle 24 by cutting through the flange 33, the flange 34, or both. That is, the port 26 can pass over the shuttle 24 as shown in FIG. 7, under or over the shuttle 24 as shown in FIGS. 11 and 12, or any desired combination. Specially shaped orifices leading into and out of the port 26 may be provided to facilitate rapid gas or fluid transfer between chambers. As previously indicated, the openings may be radially disposed on the web 54 to facilitate spacing.

Figure 13:
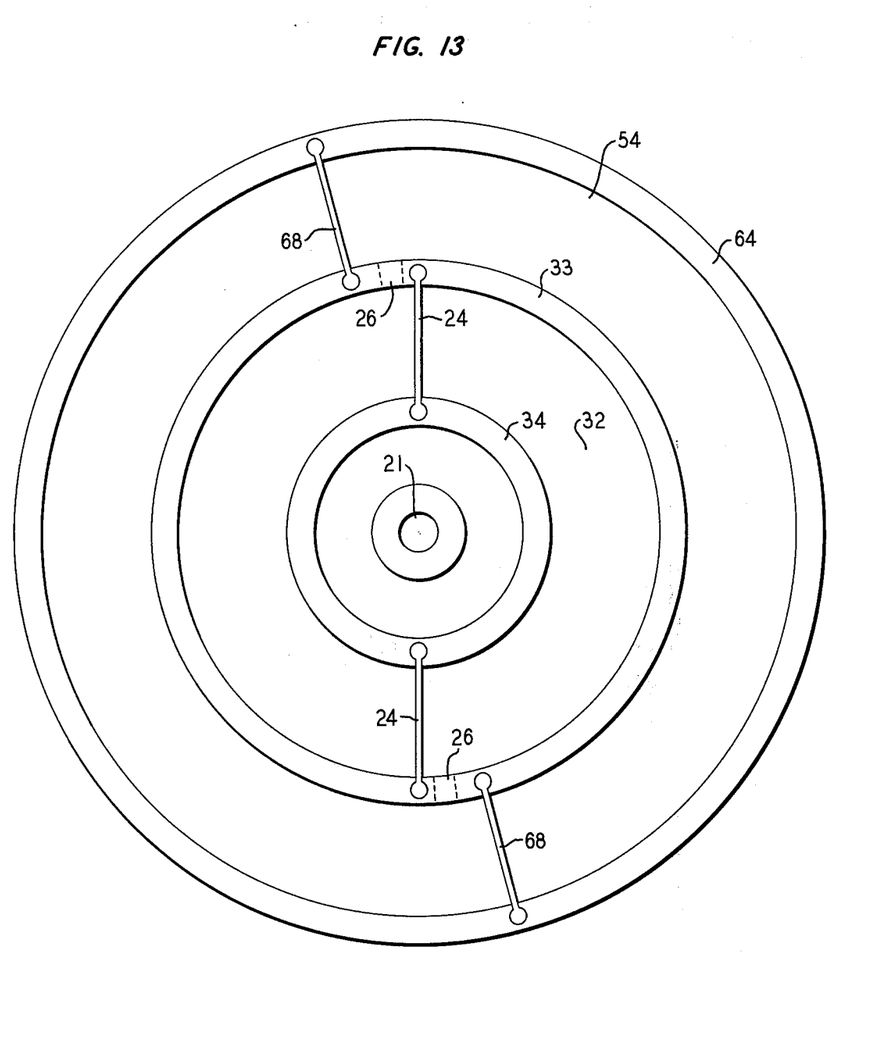
FIG. 13 is a front elevation view of an alternate form of a rotary type engine made in accordance with this invention and having two superimposed annular shuttle tracks.
Figure 14:
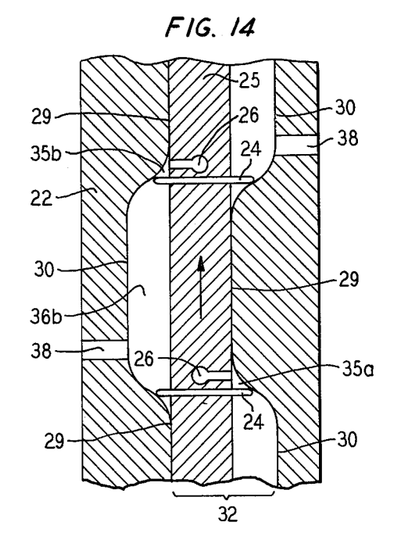
FIGS. 14 and 15 are schematic illustrations of the mechanical interaction between the components in the superimposed shuttle tracks shown in FIG. 13 during operation, FIG. 14 being the lower and FIG. 15 being the upper shuttle track, respectively.
Figure 15:
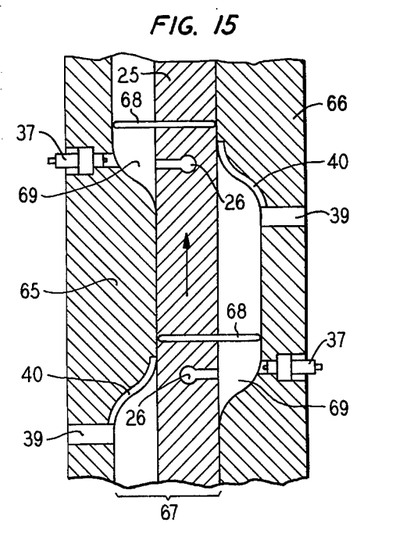

Alternately, as shown in FIG. 13, the port 26 can be arranged to vent between two tandem shuttle tracks. In the embodiment illustrated in FIGS. 13, 14, and 15, for example, an additional flange 64 has been added to the web 54 and cooperates, as illustrated in FIG. 15, with two cam members 65 and 66 to create a second shuttle track 67 which is superimposed over the shuttle track 32 so as to form two concentric rings. As in the shuttle track 32, a shuttle 68 is mounted to reciprocate in the impeller 25 as it traverses the shuttle track 67.

The shuttle 68, however, is spatially or angularly out of phase with the shuttle 24 as the two move. Specifically, as best seen in FIGS. 14 and 15, the shuttle 68 is in the outer ring and leads the shuttle 24 which is in the inner ring. The spatial or angular phasing is achieved by misaligning the shuttle tracks with respect to each other. By doing so, vacuum or decompression chambers 69 in the shuttle track 67 can be caused to form over the compression chambers 35a and 35b in the shuttle track 32. Thus, the port 26 can be extended from one shuttle track to the other through the flange 33. As a result, gas compressed in the shuttle track 32 can be transferred to the outer shuttle track 67 for combustion.

With the foregoing arrangement, several advantages are readily achieved. Gas exhaust, for example, is easier to to treat in the outer reaches or rings of the engine. Similarly, heat dissipation can be more readily handled. At the same time, the moment generated by the shuttles will have a greater lever arm to act through, thereby permitting better engine performance to be achieved. Most importantly, however, the outer ring or track can be dedicated solely to combustion and exhaust while the inner ring or track deals only with intake and compression. Furthermore, as shown in FIG. 14, the compression cycle continuously repeats itself by alternating from one side of the impeller 25 to the other. Similarly, as shown in FIG. 15, the combustion cycle alternates identically.

While the foregoing embodiments have concentrated on rotary impellers, it will be recognized that reciprocal arrangements can readily be achieved. Moreover, the engine could readily be adapted to serve as a pump, steam engine, hydraulic motor, air motor, or the like.

In summary, an improved impeller type engine has been disclosed which exhibits mechanical simplicity, reduced size, and versatility of output. Moreover, all of those advantages are achieved in a device which is dynamically balanced in operation. It will be recognized, however, that the embodiments disclosed are merely representative of the invention and many other embodiments falling within the scope of the invention will readily occur to those skilled in the art.

I claim:

1. In an impeller driven engine, the combination comprising:

two oppositely disposed wall members adapted to move in concert with each other;

cam means cooperating with said wall members to form a tunnel, said cam means being stationary with respect to said wall members and including two oppositely disposed cam surfaces equally spaced from each other so as to impart a uniform width to said tunnel and spacially disposed on a curving path so as to impart a serpentine configuration to said tunnel;

impeller means having a web rigidly linking said wall members and dividing said tunnel into individual compartments, said web being located between said cam surfaces on a straight line projecting coextensively with portions thereof so that said compartments alternate with each other in over-lapping relationship on opposite sides of said web and being apertured by at least one elongated slot extending in a direction perpendicular to said line so as to alternately communicate with said compartments as said impeller means moves;

carrier means for transporting said impeller means along said line;

first shuttle means for sequentially sweeping through said compartments in response to movement of said impeller means, said first shuttle means being slidably mounted to reciprocate in said slot and having its periphery in continuous contact with both of said wall members and said cam surfaces so as to form a seal therewith and to divide each compartment into two individual chambers as its sweeps therethrough whereby gaseous material in the chamber ahead of said moving first shuttle means will be compressed and gaseous material in the chamber behind said first shuttle means will be expanded:

means for selectively charging compartments with an explosive gaseous mixture, detonating said gaseous mixture and discharging compartments to exhaust the by-products of said gaseous mixture after it has exploded, and port means for conducting a gaseous mixture compressed in a compression chamber located on one side of said first shuttle means into a combustion chamber located on the other side of said first shuttle means, said port means comprising a passage passing through said web for transitionally connecting said compression and combustion chambers and being wholly contained within said impeller means whereby said passage moves with said impeller and a gaseous mixture compressed in said compression chamber will expand into said combustion chamber when the two are connected by said passage.

2. The combination in accordance with claim 1 wherein said passage has a length sufficient to delay communication between said compression and said combustion chambers during impeller movement whereby said combustion chamber will develop a reduced pressure and thereby expedite transfer of said gaseous mixture through said passage.

3. The combination in accordance with claim 2 wherein said passage passes over and under said shuttle.

4. The combination in accordance with claim 3 wherein said carrier means is a drive shaft, said impeller means is a rotor attached to said drive shaft and said first shuttle means drives said rotor to turn said drive shaft.

5. The combination in accordance with claim 4 wherein said rotor is circular in configuration and supports a second shuttle means on its periphery.

6. The combination in accordance with claim 5 wherein said first shuttle means is spaced 180° from said second shuttle means.

7. In an impeller driven engine, the combination comprising:

first cam means having a plurality of lands and grooves arranged in a symetrical pattern;

second cam means having similar lands and grooves arranged in a pattern identical to the pattern on said first cam means and being oriented so that lands and grooves on both cam means cooperate to form a curvilinear shuttle track of uniform width;

impeller means having a web interposed between said first and second cam means in contact with the lands on both and moveably disposed in said shuttle track, said web being perforated by a slot extending perpendicularly to the surface of said land;

cover means for establishing discrete compartments in said shuttle track by enclosing portions thereof which lie between said web and the grooves in said first and second cam means, said cover means being rigidly attached to said web so as to move in concert with said impeller means and including a pair of oppositely disposed parallel grooves communicating with said slot;

carrier means for transporting said impeller means along said shuttle track;

shuttle means slidably disposed in said slot and grooves and embracing in continuous peripheral contact said first and second cam means to form a seal therewith as said impeller means moves whereby each compartment is divided into a compression chamber and an expansion chamber as said shuttle means passes therethrough;

means for selectively charging compartments with an explosive gaseous mixture, detonating said gaseous mixture and forcibly purging said compartments to exhaust the by-products of the explosion of said mixture, and port means for transitionally linking a compression chamber located on one side of said shuttle means with an expansion chamber located on the other side of said shuttle means, said port means being wholly contained within said impeller means and including a passage extending through said web whereby said port means moves with said impeller and a gaseous mixture compressed in said compression chamber will expand into said expansion chamber when the two are connected by said port means.

8. The combination in accordance with claim 7 wherein said port means has a configuration adapted to delay communication between said compression and expansion chambers during impeller movement whereby a low pressure will develop in said expansion chamber and thereby facilitate transfer through said port means.

9. The combination in accordance with claim 8 wherein said impeller is a circular rotor attached to a drive shaft and said cover includes annular flanges on said rotor.

10. In a rotary engine, the combination comprising:
a circular rotor having a hub joined to a shaft, a pair of annular flanges and a central web joining said flanges to said hub so as to form first and second concentric annular channels oriented in opposite registration with each other;
a first side cover slidably engaging the periphery of said first channel and having a plurality of lands and grooves disposed on its inside face in a symetrical annular pattern to form a first cam surface, said first cam surface being located in registration with said first channel so that lands therein are in contact with said web and grooves therein are spaced from said web to form a series of compartments;
a second side cover slidably engaging the periphery of said second channel and having a plurality of lands and grooves disposed on its inside face to form a second cam surface identical to said first cam surface, said second cam surface being located in registration with said second channel so that lands thereon are in contact with said web and said grooves therein are spaced from said web to form a series of compartments, said first and second cam surfaces cooperating with each other and said first and second channels to form an enclosed first shuttle track of uniform width;
first shuttle means projecting through said web and slidably mounted in a set of opposed slots extending from one channel to the other, said first shuttle means having a length equal to the width of said first shuttle track so as to form a seal with said first and second chambers and cam surfaces and form a sealed compression chamber in one compartment and a sealed vacuum chamber in a second compartment as it passes simultaneously through said compartments in response to rotation of said rotor;
means for selectively charging compartments with an explosive gaseous mixture, detonating said mixture and forcibly purging said compartments to exhaust by-products of the explosion of said mixture, and
port means for transitionally extending a passage between a sealed compression chamber located on one side of said first shuttle means and a sealed vacuum chamber located on the other side of said first shuttle means, said port means being wholly contained within said rotor and including a passage extending through said web whereby said port means will move with said rotor and a gaseous mixture compressed in said compression chamber will expand into said vacuum chamber when the two are connected by said port means and said port means having a configuration adapted to delay communication between said compression chamber and said vacuum chamber during rotor movement whereby a low pressure will develop in said vacuum chamber and thereby facilitate transfer of said gaseous mixture through said port means.

11. The combination in accordance with claim 10 wherein said first and second cam surfaces are raised above the faces of said side covers so that each is embraced within said first and second channels, respectively.

12. The combination in accordance with claim 10 wherein the periphery of said rotor is equipped with an external ring gear to facilitate starting.

13. The combination in accordance with claim 10 wherein said web includes a second shuttle means projecting therethrough in a manner identical to said first shuttle means.

14. The combination in accordance with claim 13 wherein said second shuttle means is disposed diametrically opposite to said first shuttle means.

15. The combination in accordance with claim 14 wherein said web includes a plurality of shuttle means projecting therethrough in symetrical cooperation with said first and second shuttle means.

16. The combination in accordance with claim 10 wherein said rotor is ported to transport a fluid therethrough.

17. A shuttle type engine having opposed cams oriented to form a curvilinear shuttle track of uniform width between the cam working surfaces, cover means slidably engaging said cams and enclosing said shuttle track to form a tunnel, an impeller dividing said tunnel into compartments and a shuttle carried along said shuttle track by said impeller and adapted to divide each compartment into a compression and expansion chamber as it passes therethrough CHARACTERIZED IN THAT said cover means includes a pair of opposed grooves aligned in registration with the long dimension of said shuttle, the longitudinal edges of said shuttles are slidably engaged within said grooves and the ends of said shuttle are notched to embrace said cams.

18. An impeller type engine in accordance with claim 17 wherein said shuttle is divided into two sections and includes biasing means for urging each away from the other and into contact with said cams.

19. A shuttle type engine in accordance with claim 18 wherein said biasing means comprises a spring.

20. A shuttle type engine in accordance with claim 18 wherein said biasing means comprises oppositely poled magnetic circuits.

21. An impeller type engine in accordance with claim 18 wherein the longitudinal ends of said shuttle and the internal configuration of said grooves are circular in cross section.

22. A shuttle type engine in accordance with claim 18 wherein the cross section of one longitudinal edge of said shuttle is arrow shaped, the cross section of the other longitudinal edge of said shuttle is shaped in the form of a truncated wedge and said grooves have a circular internal configuration.

* * * * *

UNITED STATES PATENT AND TRADEMARK OFFICE
CERTIFICATE OF CORRECTION

PATENT NO. : 3,942,484
DATED : March 9, 1976
INVENTOR(S) : Delbert W. Pile

It is certified that error appears in the above—identified patent and that said Letters Patent are hereby corrected as shown below:

On the Cover Sheet, Item " 76 " should read as shown below:

-- Inventor: Delbert W. Pile
113 Balantine Road
Middletown, New Jersey 07748 --.

Signed and Sealed this

Twentieth Day of July 1976

[SEAL]

Attest:

RUTH C. MASON
*Attesting Officer*

C. MARSHALL DANN
*Commissioner of Patents and Trademarks*